(12) United States Patent
Cindrich

(10) Patent No.: US 11,458,761 B2
(45) Date of Patent: Oct. 4, 2022

(54) TRACTION SYSTEM FOR VEHICLE

(71) Applicant: Joe Cindrich, Langley (CA)

(72) Inventor: Joe Cindrich, Langley (CA)

( * ) Notice: Subject to any disclaimer, the term of this patent is extended or adjusted under 35 U.S.C. 154(b) by 224 days.

(21) Appl. No.: 16/589,289

(22) Filed: Oct. 1, 2019

(65) Prior Publication Data

US 2021/0094350 A1   Apr. 1, 2021

(51) Int. Cl.
*B60B 15/26* (2006.01)
*B60B 11/00* (2006.01)

(52) U.S. Cl.
CPC ............ *B60B 15/266* (2013.01); *B60B 11/00* (2013.01); *B60B 15/26* (2013.01); *B60B 15/263* (2013.01)

(58) Field of Classification Search
CPC ...... B60B 15/26; B60B 15/266; B60B 15/263
See application file for complete search history.

(56) References Cited

U.S. PATENT DOCUMENTS

| | | | | |
|---|---|---|---|---|
| 2,079,501 A | * | 5/1937 | Gallagher | B60B 15/16 301/47 |
| 2,254,318 A | * | 9/1941 | Roessel | B60C 27/045 301/47 |
| 2,765,199 A | * | 10/1956 | Partin | B60B 15/04 301/47 |
| 5,788,335 A | * | 8/1998 | O'Brien | B60B 15/26 301/40.6 |
| 6,022,082 A | * | 2/2000 | O'Brien | B60B 15/263 152/216 |
| 6,244,666 B1 | * | 6/2001 | O'Brien | B60B 3/02 152/210 |

FOREIGN PATENT DOCUMENTS

| | | | | |
|---|---|---|---|---|
| CN | 203110798 U | * | 8/2013 | ........... B60B 15/263 |
| KR | 20140107149 A | * | 9/2014 | ........... B60B 15/263 |

* cited by examiner

*Primary Examiner* — Jason R Bellinger
(74) *Attorney, Agent, or Firm* — Capehart Law Firm

(57) ABSTRACT

A vehicle traction system that is operably coupled to a vehicle and is deployable to assist in providing improved traction on surfaces such as but not limited to snow or ice. The present invention includes a housing that is annular in diameter and mounted intermediate inner and outer dual wheel flanges. Movably coupled with the housing are a plurality of connection members. The connection members have secured thereto tractions pads. The connection members are configured to extend outward to place the traction pads in position to engage a surface on which the vehicle is superposed. The connection members include an engagement plate distally mounted from the traction pads. The connection members are configured to extend outward to place the traction pads in position to engage a surface on which the vehicle is superposed. The connection members include an engagement plate distally mounted from the traction pads. An air bladder is adjacent the engagement plate and is operable to transition the connection member to its second position. A biasing member is operably coupled with the connection member and is configured to return the connection member to its first position.

6 Claims, 4 Drawing Sheets

TRACTION SYSTEM FOR VEHICLE

REFERENCE TO PENDING APPLICATIONS

This application does not claim the benefit of any issued U.S. Patent or pending application.

TECHNICAL FIELD

The present invention relates generally to automobile accessories, more specifically but not by way of limitation, a vehicle traction system that is configured to provide the ability to be deployed upon requirement wherein the present invention includes extendible support members having traction pads coupled thereto wherein the traction pads are intermediate to a dual tire configuration.

BACKGROUND

In many areas the climate change throughout the year precipitates various different weather patterns and as such driving conditions. In some areas the summer months have significant rainfall and as such drivers must take precautions when driving in wet conditions. Winter provides numerous vehicle operation challenges to individuals operating various types of vehicles. Vehicle operators must implement certain protocols during the snow and ice conditions that are typically present during the winter months. Snow and ice result in significantly reduced traction and as such many individuals will utilize various techniques to improve traction while driving in these conditions.

Drivers will commonly utilize snow tires or chains in order to provide better traction in snow and ice conditions. Many governments require the installation of snow tires by a certain date and wherein the snow tires must remain installed on the vehicle until an allowed removal date. For commercial vehicles, it is quite common for a vehicle operator to temporarily install chains over the tires in order to improve traction. One issue with installing chains is the cumbersome installation process. Chain installation can take significant time and is difficult on vehicles such as but not limited to commercial vehicles wherein these vehicles often have a dual side-by-side tire arrangement. Furthermore, when in inclimate weather, installing the chains in these types of weather conditions is generally undesirable for a user. Lastly, the chains often will damage or cause excessive wear on the tire which can lead to costly replacements, and tire chains cause unnecessary damage to the road surface if left on when no longer required. Further, autonomous vehicles are becoming more available. However, these vehicles do not have the capability to install and/or deploy a traction system when on hazardous road conditions.

Accordingly, there is a need for a vehicle traction system that can be automatically deployed by the onboard autonomous control system, or a vehicle operator from within the vehicle and wherein the traction system may be deployed by the driverless truck as needed, or does not have to be mounted over the tire which results in damage thereto.

SUMMARY

It is the aspect of the present invention to provide a vehicle traction system that is configured to enhance the traction of a driverless, or human operated, vehicle in inclimate conditions such as snow or ice wherein the traction system of the present invention is configured to be Further, autonomous vehicles are becoming more available. However, these vehicles do not have the capability to install and/or deploy a traction system when on hazardous road conditions operably coupled to a side-by-side tire arrangement on a vehicle, or to a single tire configuration.

Another aspect of the present invention is to provide a vehicle traction system that is configured to provide enhanced handling on treacherous road surfaces wherein the present invention includes a plurality of deployable traction pads intermediate the side-by-side mounted tires.

A further aspect of the present invention is to provide a vehicle traction system that is configured to enhance the traction of a vehicle in inclimate conditions such as snow or ice wherein the traction pads are deployable intermediate a first position and a second position.

Still another aspect of the present invention is to provide a vehicle traction system that is configured to provide enhanced handling on treacherous road surfaces wherein the traction pads are deployable utilizing a compressed air source.

An additional aspect of the present invention is to provide a vehicle traction system that is configured to enhance the traction of a vehicle in inclimate conditions such as snow or ice that further compressed air operable connection members that are operably coupled to the traction pads.

Yet a further aspect of the present invention is to provide a vehicle traction system that is configured to provide enhanced handling on treacherous road surfaces wherein the connection members are operably coupled within a housing.

Another aspect of the present invention is to provide a vehicle traction system that is configured to enhance the traction of a vehicle in inclimate conditions such as snow or ice wherein the traction pads are returned to a first position utilizing a biasing member operably coupled thereto.

Still an additional aspect of the present invention is to provide a vehicle traction system that is configured to provide enhanced handling on treacherous road surfaces wherein in the present invention is configured to be installed on one or multiple axle vehicles.

To the accomplishment of the above and related aspect the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWING

In drawings which illustrate embodiments of the invention wherein similar characters of reference denote corresponding parts in each view.

A more complete understanding of the present invention may be had by reference to the following Detailed Description and appended claims when taken in conjunction with the accompanying Drawings wherein:

DETAILED DESCRIPTION FO THE INVENTION

Figure 1A:
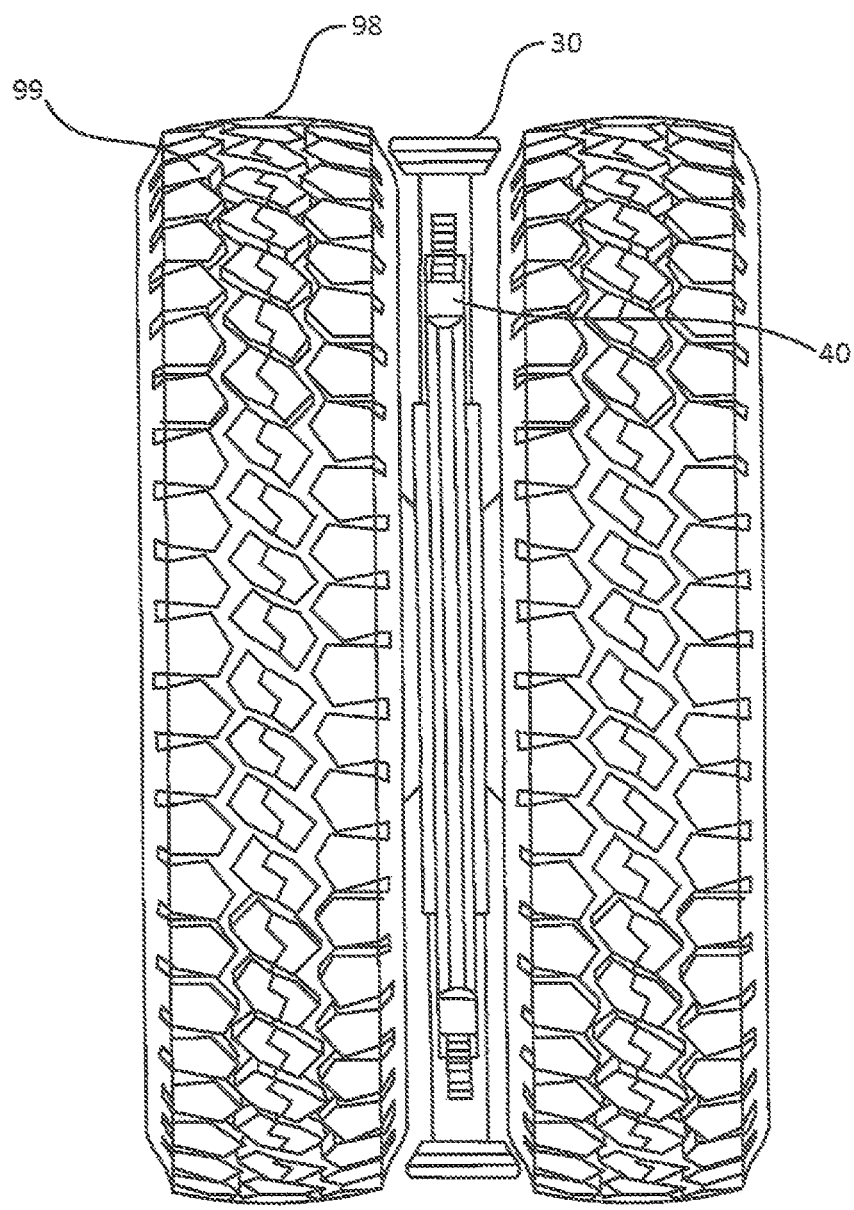
FIG. 1A is a front perspective view of the present invention with the traction pads in a first position.

Referring now to the drawings submitted herewith, wherein various elements depicted therein are not necessarily drawn to scale and wherein through the views and figures like elements are referenced with identical reference numerals, there is illustrated a vehicle traction system 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular the Figures submitted as a part hereof, the vehicle traction system 100 further includes a housing 10 wherein the housing 10 is manufactured from a suitable durable material such as but not limited metal. The housing 10 is mounted intermediate tires 99 utilizing suitable durable techniques more specifically but not by way of limitation between the inner and outer dual wheel flanges on hub studs of a conventional dual side-by-side tire arrangement.

While the vehicle traction system 100 is illustrated and discussed herein being deployed on a dual sideby-side tire arrangement, it should be understood that the vehicle traction system 100 could be configured to be deployed on a single tire configuration. The housing 10 is annular in shape and is configured to have a diameter generally equivalent to the diameter of the tires 99. As will be further discussed herein, the housing 10 is formed to facilitate the reciprocal movement of the connection member 20 therethrough.

The connection members 20 are circumferentially disposed on the housing 10 and are manufactured from a suitable rigid material. The connection members 20 include a first end 21 and a second end 22. The first end 21 of the connection members 20 are operably coupled to engagement plate 25. Secured to the second end 22 of the connection members 20 are traction pads 30. The connection members 20 are movable intermediate a first position and a second position. In the first position, the connection members 20 are retracted into the housing 10 in order to position the traction pads 30 at a position such that the tractions pads 30 are below the outer surface 98 of the tires 99. In the first position the traction pads 30 are positioned so as to not engage the surface upon which the tires 99 are superposed.

Figure 1B:
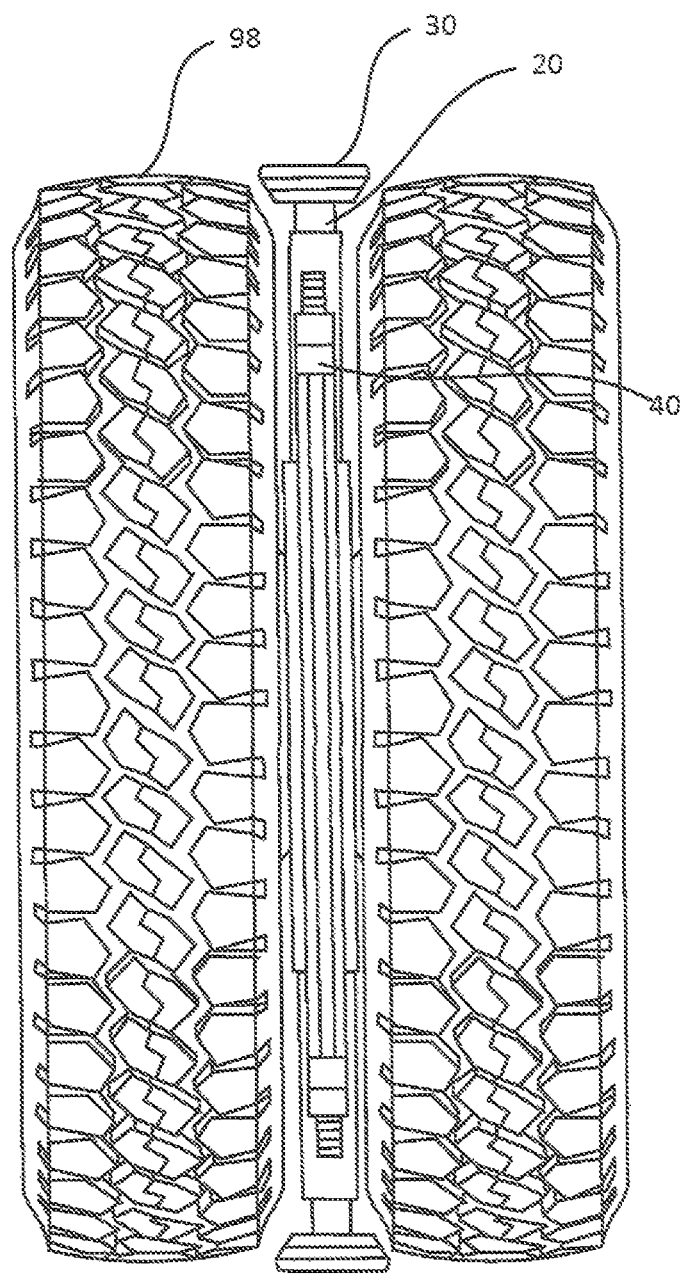
FIG. 1B is a front perspective view of the present invention with the traction pads in a second position.
Figure 2:
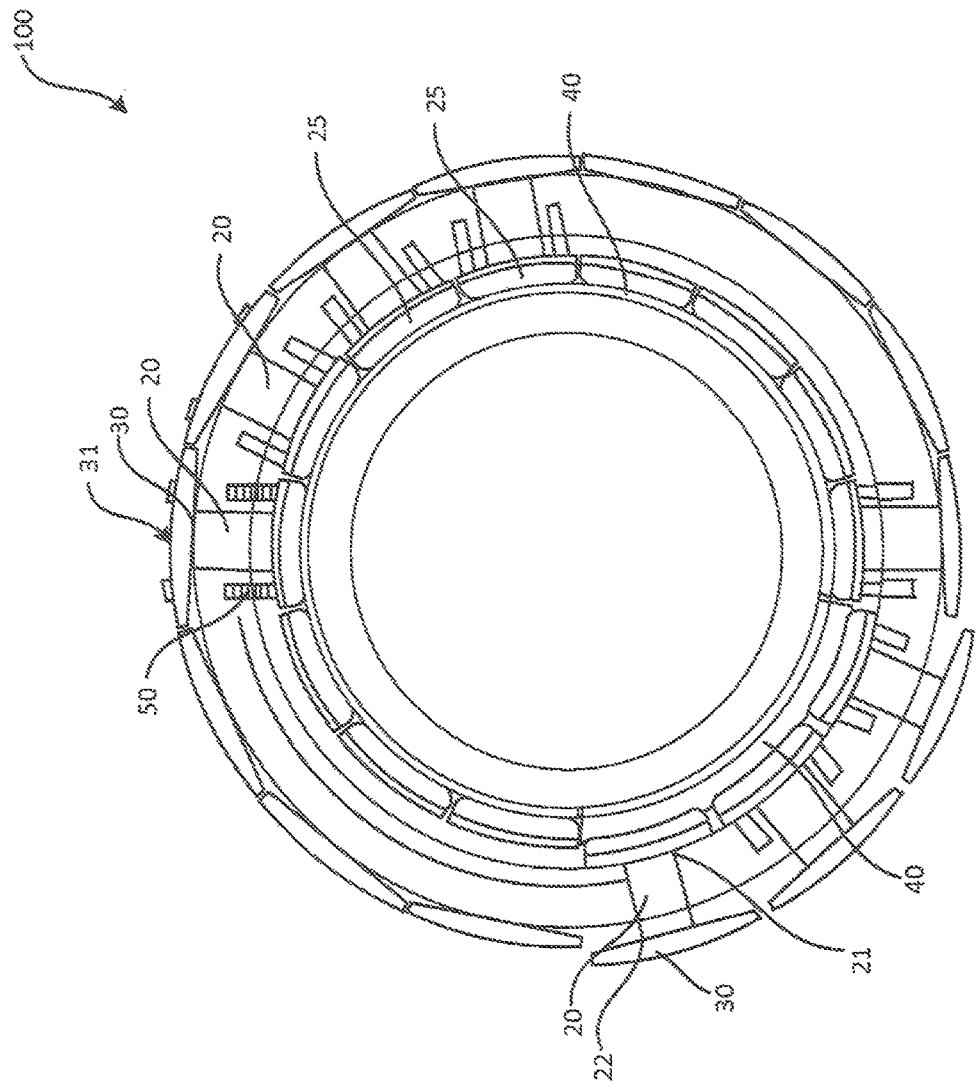
FIG. 2 is a cross-sectional view of the present invention.

In the second position, the connection members 20 are extended outward from the housing 10 as illustrated herein in particular in the right portion of FIG. 1. In the second position the connection member 20 is extended outward so as to position the traction pads 30 such that the traction pads 30 are generally level with or slightly above the surface area 98 of the tires 99. In the second position of the connection members 20 the traction pad 30 will engage the surface on which the tires 99 are superposed so as to improve the coefficient of friction therewith for a vehicle on which the vehicle traction system 100 is installed.

Figure 3A:
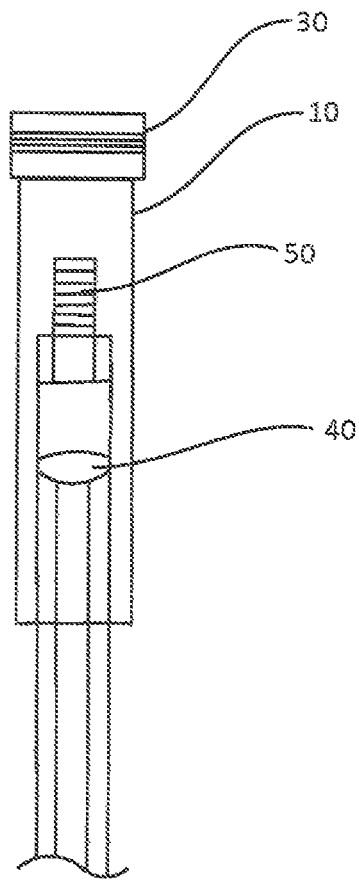
FIG. 3A is a cross-section view of the connection members and traction pads of the present invention in the first position.
Figure 3B:
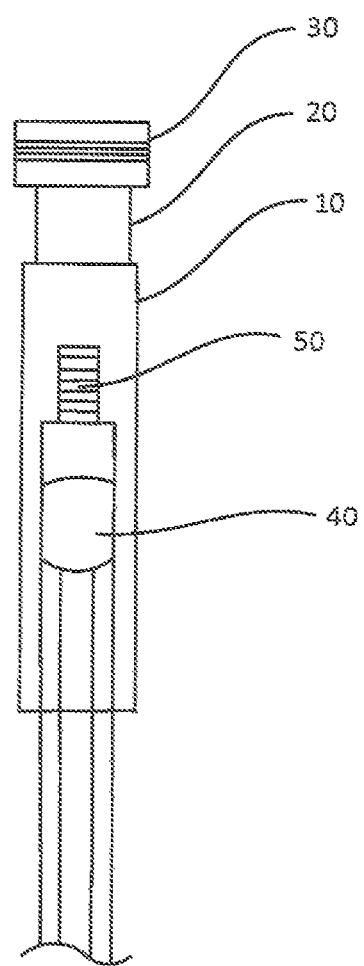
FIG. 3B is a cross-section view of the connection members and traction pads of the present invention in a second position.

The connection members 20 are movable intermediate their first position and second position utilizing an air bladder 40. The air bladder 40 is operably coupled to a conventional central tire inflation system (not particularly illustrated herein) mounted on the vehicle that has the vehicle traction system 100. The air bladder 40 controls the position of the connection members 20 through inflation and deflation thereof. As is shown herein in FIG. 3, in a deflated position the connection member 20 is retracted into its first position which places the traction pad 30 in a position such that the traction pad will not engage the surface on which the tires 99 are superposed. Subsequent inflation of the air bladder 40, the connection member 20 is extended outward from the housing 10 in order to position the traction pad 30 such that the traction pad will engage the surface on which the tires are superposed. The air bladder 40 is configured to retain a volume suitable to move the connection member 20 into its second position wherein the air bladder 40 engages the engagement plates 25 in order to transition the connection members 20 from a first position to a second position. The engagement plates 25 are rigid plates that are configured to provide a suitable surface area for the air bladder to bias there against in order to achieve the desired functionality of moving the connection member 20 to its second position. It is contemplated within the scope of the present invention that the engagement plates 25 could be manufactured in alternate shapes and sizes. While not particularly illustrated herein, it is contemplated within the scope of the present invention that the vehicle traction system 100 includes a conventional solenoid valve or similar structure that is configured to release the air pressure from an inflated air bladder 40 so as to return the connection members 20 to their first position.

The traction pads 30 are manufactured from a suitable durable rigid material. The traction pads 30 include an upper surface 31 that is configured to provide improved traction on surfaces such as but not limited to snow or ice. It is contemplated within the scope of the present invention that the upper surface 31 of the traction pads 30 could be configured with various elements to achieve the aforementioned objective. By way of example but not limitation, the upper surface 31 of the traction pads 30 could be configured with metal studs. The traction pads 30 are formed having a slight radius so as to correlate with the radius of the tires 99. This shape ensures no disruption of conventional performance when the connection members 20 are deployed into their second position.

The connection members 20 are retracted into their first position subsequent deflation of the air bladder 40 utilizing biasing member 50. Biasing member 50 is operable to assist in the complete retraction of the connection member 20 into its first position. In a preferred embodiment of the vehicle traction system 100 the biasing member 50 is a coil spring that is extended during movement of the connection member 20 to its second position and upon deflation of the air bladder 40 the biasing member 50 provides sufficient force to return the connection member 20 to its first position. While a coil spring is utilized in a preferred embodiment of the vehicle traction system 100, it is contemplated within the scope of the present invention that the biasing member 50 could be formed from alternate material and/or elements.

While the vehicle traction system 100 is illustrated herein as having a plurality of connection member 20 with traction pads 30 operably coupled thereto, it should be understood within the scope of the present invention that the vehicle traction system 100 could have as few as one connection member 20 and traction pad 30 or a plurality such that substantially most of the circumference of the tires 99 have traction pads 30 adjacent thereto. Furthermore, it should be understood within the scope of the present invention that the traction pads 30 could be manufactured in alternate sizes and shapes in order to achieve the desired objective discussed herein. Lastly, it should be understood within the scope of the present invention that the vehicle traction system 100 could be mounted to either one tire set or more than one tire set on a vehicle.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

While preferred embodiments of the present inventive concept have been shown and disclosed herein, it will be obvious to those persons skilled in the art that such embodiments are presented by way of example only, and not as a limitation to the scope of the inventive concept. Variations, changes, and substitutions may occur or be suggested to those skilled in the art without departing from the intent, scope, and totality of this inventive concept. Such variations, changes, and substitutions may involve other features which are already known per se and which may be used instead of, in combination with, or in addition to features already disclosed herein. Accordingly, it is intended that this inventive concept be inclusive of such variations, changes, and substitutions, and by no means limited by the scope of the claims presented herein.

I claim:

1. A vehicle traction system operably coupled to wheels of a vehicle, the vehicle traction system comprises:
    a housing, said housing being operably mounted intermediate an inner wheel and outer wheel of a dual side-by-side tire configuration, said housing being annular in shape;
    a plurality of connection members, said plurality of connection members being operably coupled to said housing, said plurality of connection members being circumferentially disposed on said housing, said plurality of connection members having a first end and a second end, said plurality of connection members being movable intermediate a first position and a second position, said plurality of connection members configured to extend outward from said housing in said second position;
    a plurality of traction pads, said plurality of traction pads being secured to said second end of said plurality of connection members, said plurality of traction pads having an upper surface configured to enhance traction on snow or ice, said traction pads configured to engage a surface on which the vehicle is superposed when said plurality of connection members are placed in said second position;
    a plurality of engagement plates, said plurality of engagement plates being secured to said first end of said plurality of connection members; and
    an air bladder operably coupled to a central tire inflation system mounted on the vehicle, said air bladder being annular in shape, said air bladder positioned to engage each of said plurality of engagement plates, said air bladder configured to be inflated and deflated, said air bladder operable to move each of said plurality of connection members operably coupled to said plurality of engagement plates intermediate said first position and said second position.

2. The vehicle traction system as recited in claim 1, wherein said traction pads are formed to have a radius equivalent to that of a tire adjacent thereto.

3. The vehicle traction system as recited in claim 2, wherein said plurality of traction pads are extended beyond an exterior tread surface of the tire when said plurality of connection members are placed in said second position.

4. The vehicle traction system as recited in claim 3, and further including biasing members, said biasing members operably coupled to said plurality of connection members, said biasing members configured to return said plurality of connection members to said first position subsequent deflation of said air bladder.

5. The vehicle traction system as recited in claim 4, wherein said plurality of traction pads are disengaged with the surface on which the tires are superposed when said plurality of connection members are in said first position.

6. The vehicle traction system as recited in claim 5, wherein said biasing members are coil springs.

* * * * *